United States Patent [19]

Intengan

[11] 4,417,742
[45] Nov. 29, 1983

[54] MANUPEDAL BICYCLE

[76] Inventor: Franklin S. Intengan, P.O. Box 4058, Hialeah, Fla. 33014

[21] Appl. No.: 272,361

[22] Filed: Jun. 10, 1981

[51] Int. Cl.³ .............................................. B62M 1/00
[52] U.S. Cl. .................................. 280/234; 280/240; 280/249
[58] Field of Search ............... 280/232, 233, 234, 240, 280/249, 270

[56] References Cited

U.S. PATENT DOCUMENTS

| | | | |
|---|---|---|---|
| 2,198,717 | 4/1940 | Bottos | 280/234 |
| 3,910,599 | 10/1975 | Thomas | 280/234 |
| 4,270,766 | 6/1981 | Thomas | 280/234 |
| 4,303,255 | 12/1981 | Thomas | 280/234 |

*Primary Examiner*—Joseph F. Peters, Jr.
*Assistant Examiner*—Ross Weaver
*Attorney, Agent, or Firm*—John Cyril Malloy

[57] ABSTRACT

A bicycle with a foot cranked sprocket driven rear wheel assembly and a steering arm assembly substantially pivoting about the vertical axis located substantially in coincidence or near and substantially parallel to the axis of the bicycle frame member where the seat post is inserted. At the upper leading portion of the steering arm a hand crank is provided to drive a flexible shaft at one end of it through gearing means with the other end, the shaft engaging another gear means to drive a ring gear that turns with the foot cranked sprocket. Connected at the lower lagging portion of the steering arm assembly are linking means which are also connected to the upper portion of the front fork to impart rotation of the front wheel assembly about a vertical axis so that the steerable front wheel can be steered by the steering arm assembly.

6 Claims, 12 Drawing Figures

MANUPEDAL BICYCLE

FIELD OF THE INVENTION

This invention relates to an improvement in bicycles, and refers particularly to the driving mechanism thereof.

OBJECTS OF THE INVENTION

It is an object to provide for a bicycle with improved means for the utilization of power of the arms to assist in the propulsion of it while simultaneously steering the bicycle in the desired direction.

BACKGROUND OF THE INVENTION

Many attempts have been made to utilize simultaneously the allied foot and arm powers while the arms also steer the bicycle. In the prior art the steering mechanisms pivot with the front wheel fork while at the same time imparting power to assist turning the wheels. Because of this dual function, inefficencies result. For a person to crank efficiently the hand crank rotational axis should be substantially parallel to the person's shoulder line, while the imaginary longitudinal center plane of his body lies in coincidence to a centrally located vertically oriented plane of the hand crank. In past devices the structures are such that, when their bars or handles are turned to the right or left, the above-referred to planes will automatically produce an obtuse included angle. In these instances the person cannot transmit an effective manual crank power because the anatomy of the human arms simply cannot function effectively in this position.

SUMMARY OF THE INVENTION

The manupedal bicycle departs from all previous improvements by using an indirect steering system. The system is provided with a steering arm assembly having a crank with its rotational axis perpendicular to the longitudinal plane of a steering arm assembly. The lagging portion of the steering assembly is a pivotal axis perpendicular to the crank rotational axis. This pivotal axis is intentionally located substantially in coincidence to the longitudinal axis of the person's body operating the bicycle. Since the body of the person pivots with reference to its own longitudinal axis, it should be apparent that in any direction the hand crank is positioned while simultaneously steering the bicycle, the rotational axis of the hand crank is always maintained parallel to the person's shoulder line. Effective torque is thereby transmitted while at the same time steering the bicycle through an intermediate linking means connecting the steering arm assembly and the front fork.

The facts, proofs of this concept, its objects and applications will be better understood on reference to the following description of the embodiment of the invention illustrated in the accompanying drawings.

The manupedal bicycle combines arm and leg power in such a way that at all times while simultaneously steering the bicycle, the person's relative position to the manual cranking means is always such that he or she is in the best position to deliver the optimum torque from the arms with consideration to the person's anatomy, its functions and limits. The subject invention utilizes an indirect steering system of a steering arm assembly provided with a hand cranking means at the leading portion of the assembly. The hand cranking means rotates about an axis perpendicular to the assembly's pivot axis at the lagging portion. This latter pivot axis is intentionally made to pivot at a strategic location substantially in coincidence with the longitudinal axis of the operator. In the present structure, it is located below the seat with the pivotal axis coaxial with the axis of the vertical member of the frame where the seat post is inserted. It will now be apparent therefore that in any direction, whether to the right or left, the bicycle is steered while simultaneously being manually cranked, the cranking axis is always parallel to the person's shoulder line and perpendicular to the imaginary plane bisecting the center axis of the manual crank and the steering arm assembly's pivotal axis. This invention also employs the use of a flexible shaft means in order to transmit the manual torque to the foot pedal sprocket or directly to the wheel so that it will aid the propulsion of the machine.

This indirect steering system can also be incorporated in manually propelled machines for the use by people who are partial or total amputees in the lower extremities but still have normal arm functions. While the invention has been described in terms of its utilization as an auxiliary drive on a bicycle, the unit may be also adopted to other types of occupant propelled vehicles. For example, tandem or multi-person bicycle, tricycles and vehicles for children. These and various objects and advantages of the invention will become readily apparent to those skilled in the art upon reading the following detailed description and claims and for referring to the accompanying drawings.

DESCRIPTION OF THE PREFERRED EMBODIMENT

Figure 1:
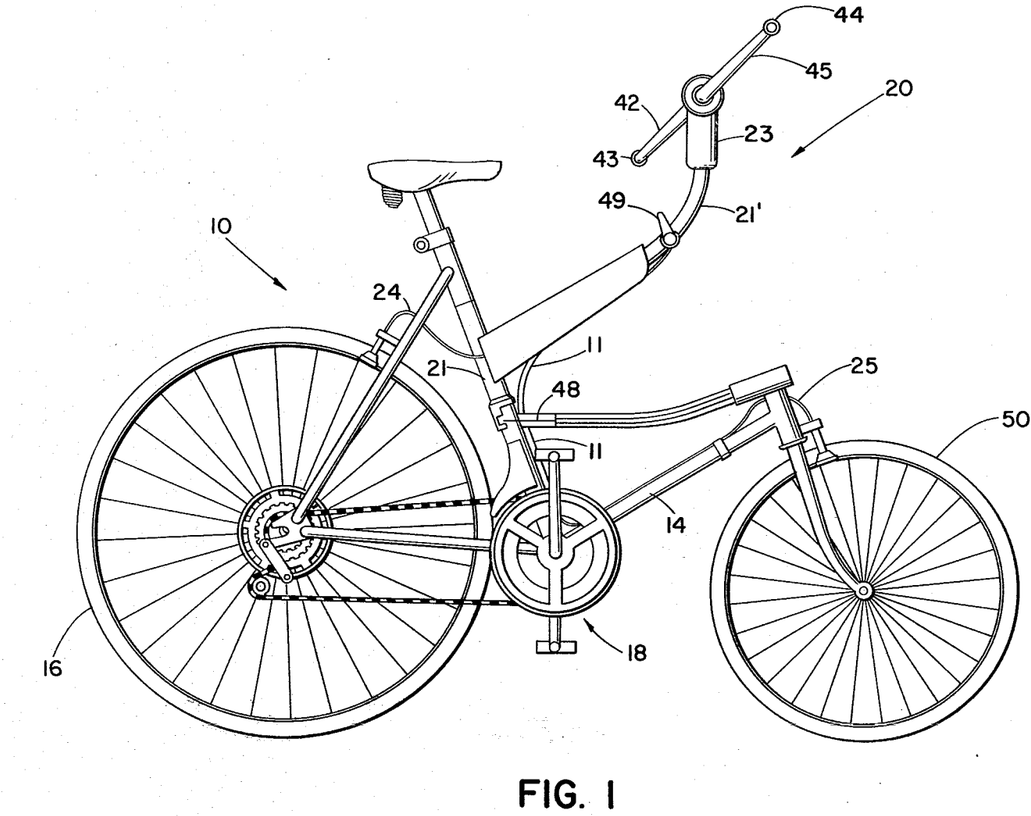
FIG. 1 is a side elevation view embodying this invention.
Figure 2:
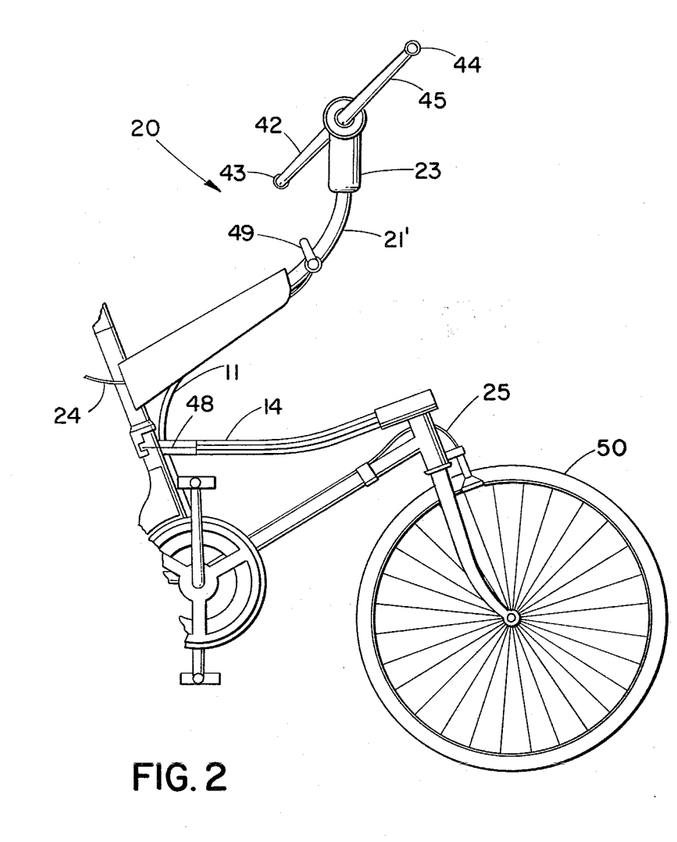
FIG. 2 is a fragmentary side elevation view showing the improvement to the usual bicycle.
Figure 3:
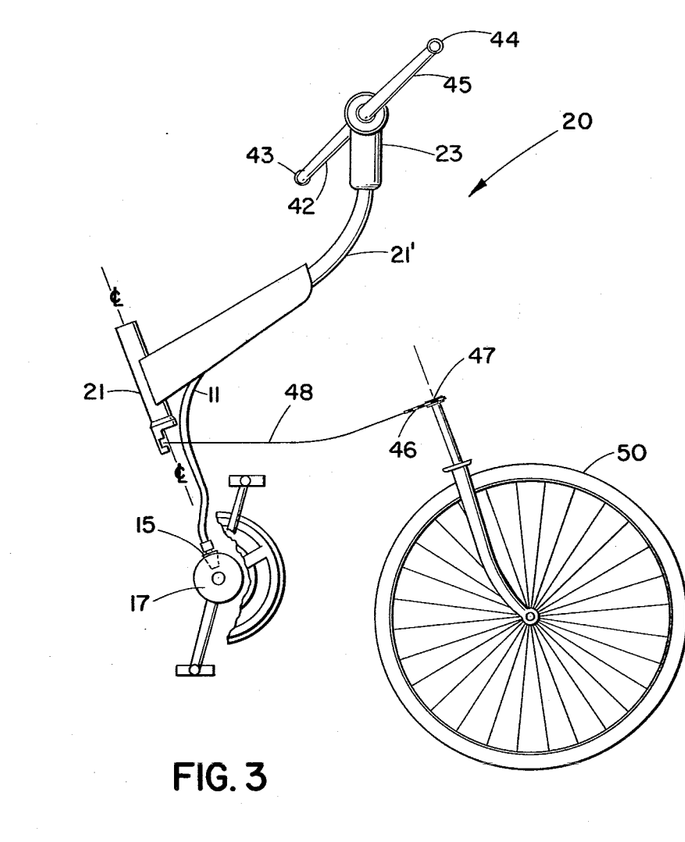
FIG. 3 is a fragmentary side elevation view showing how the indirect steering system are interconnected and how the manual power is integrated to the foot pedal sprocket by means of a flexible shaft.

Referring to the drawings, FIG. 1 discloses a bicycle 10 having apparatus associated therewith made in accordance with the present invention. The bicycle includes a rear wheel assembly 16 and a main frame 14. In the usual manner the rear assembly is rotated by a foot pedal actuated drive sprocket 18. Numeral 20 shown in various figures of the drawings broadly indicates apparatus made in accordance with the present invention for imparting a driving torque or force into the rear wheel 16 of the illustrated bicycle. It should be noted that the aforementioned apparatus can readily be made to impart driving force or torque to the front wheel 50 as well without separating from the main spirit of the invention. As seen in FIGS. 2 and 3, the front wheel 50 is adapted to be steered by a steering arm assembly comprising a pivot column 21 substantially vertically oriented. Welded to it and substantially perpendicularly disposed is pivotal steering arm 21' with a manual gear housing 23 on its leading end. Journaled to the gear housing 23 and perpendicular to an imaginary common vertical plane bisecting the axis of pivot column 21 and the longitudinal axis of steering arm 21' and housing 23 is a manual crank assembly comprising the crank right member 45 with its right handle 44 and the crank left member 42 with its left handle 43.

Figures 4, 5:
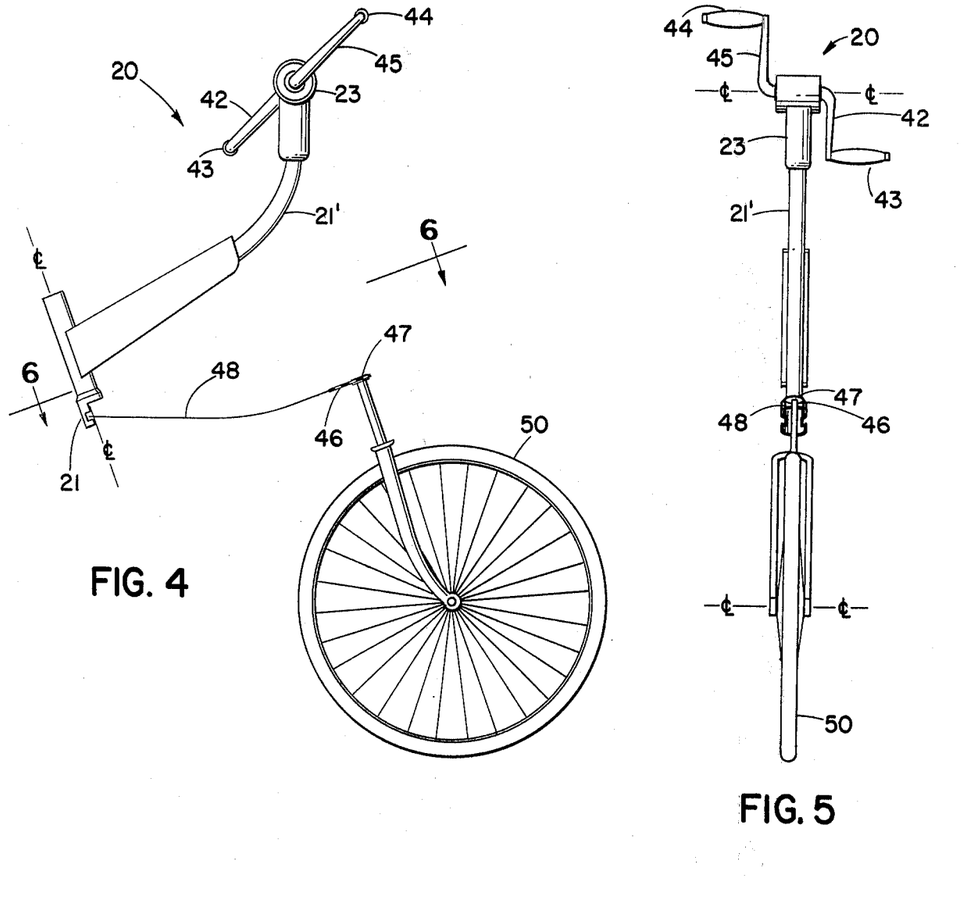
FIG. 4 is a fragmentary side elevation view showing exclusively the indirect steering arrangement.
FIG. 5 is a front elevation view of FIG. 4.
Figure 6:
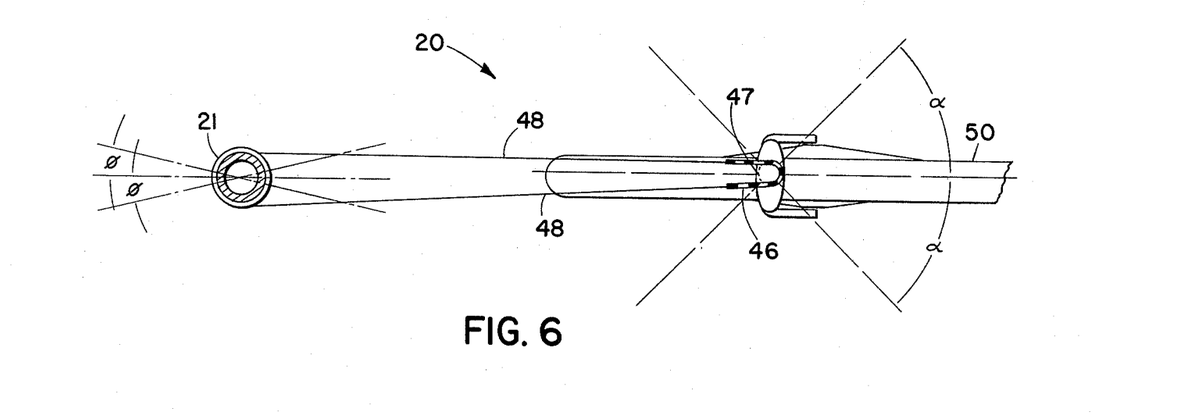
FIG. 6 is a view in cross section taken along the plane indicated by line 6—6 of FIG. 4.

Fastened at the lower end portion of the pivot column 21 on opposite sides thereof and running along both sides of the frame member 14 (FIG. 6) is a linking means 48 interconnected with a steering chain 46 that is engaged to the fork sprocket 47 fastened at the upper portion of the front fork of wheel 50. As further illustrated by FIG. 4 through FIG. 6, the steering arm assembly pivots as it is turned either to the right or left. Through the linking means 48, 46 and 47, the front steering fork assembly with its front wheel 50 turns instantaneously with the movement of the steering arm assembly. The angular steering displacement from these two points can either be reduced or amplified. In the embodiment above, we are amplifying the movement of the steering arm assembly and the final steering fork reaction of angular movement by the ratio of the driving radius which is the distance from the center axis of 21 to the point where the link 48 is fastened to the drive sprocket radius 47. This intermediate linking means is not limitd to this particular structure and different ways like hydraulic controls or by shaft and gear methods are readily applicable. It should also be noted the usual rear drive sprocket selector lever 49 is attached on the steering arm 21' as shown by FIG. 1 through FIG. 2.

Figures 7, 8, 9:
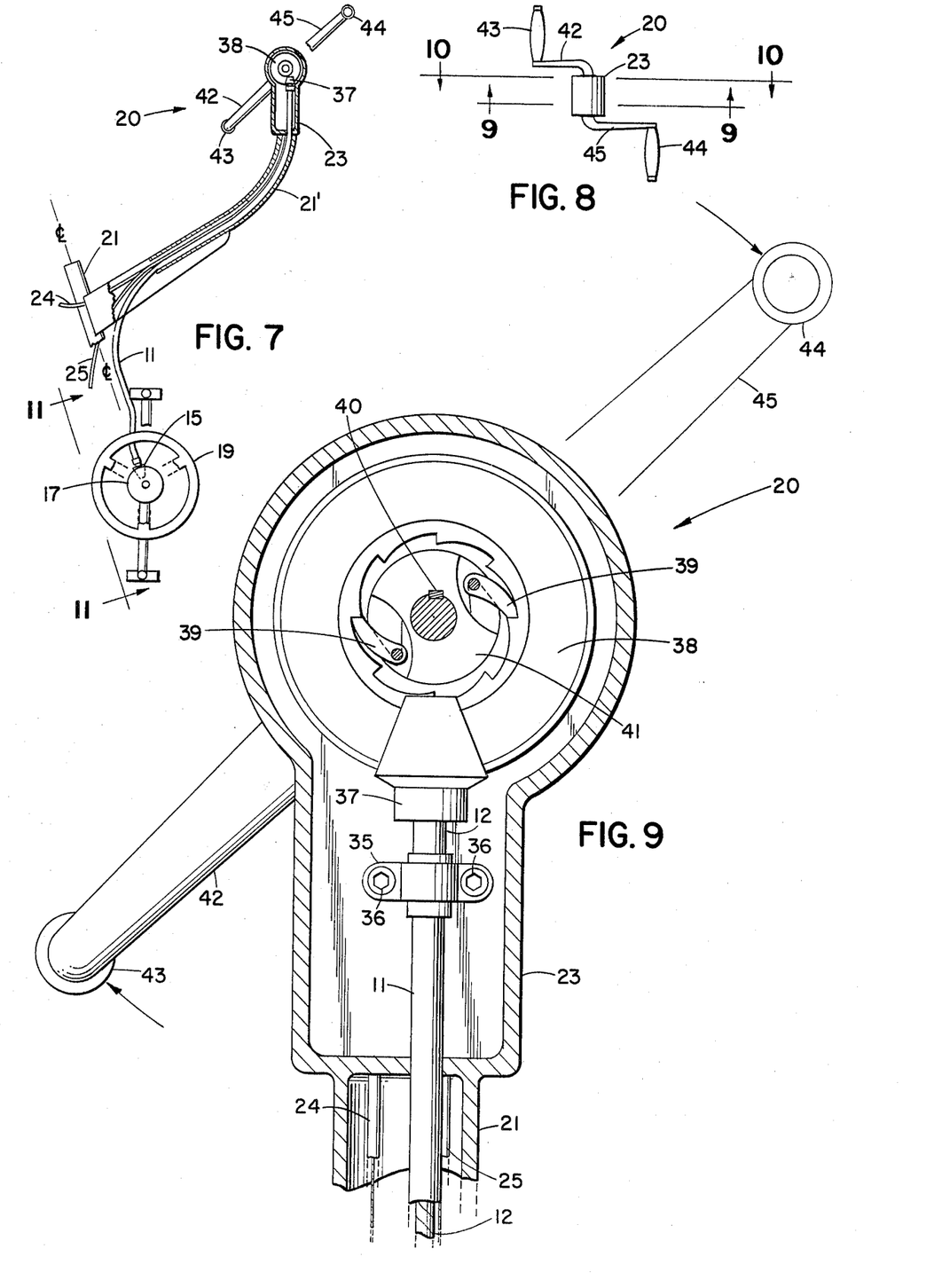
FIG. 7 is a side sectional view showing the transmission of power from the manual crank to the foot pedal sprocket by means of a flexible shaft.
FIG. 8 is a top elevation view of the manual crank portion, the leading end of the steering arm assembly.
FIG. 9 is a view in cross section taken along the plane indicated by the line 9—9 of FIG. 8.
Figure 10:
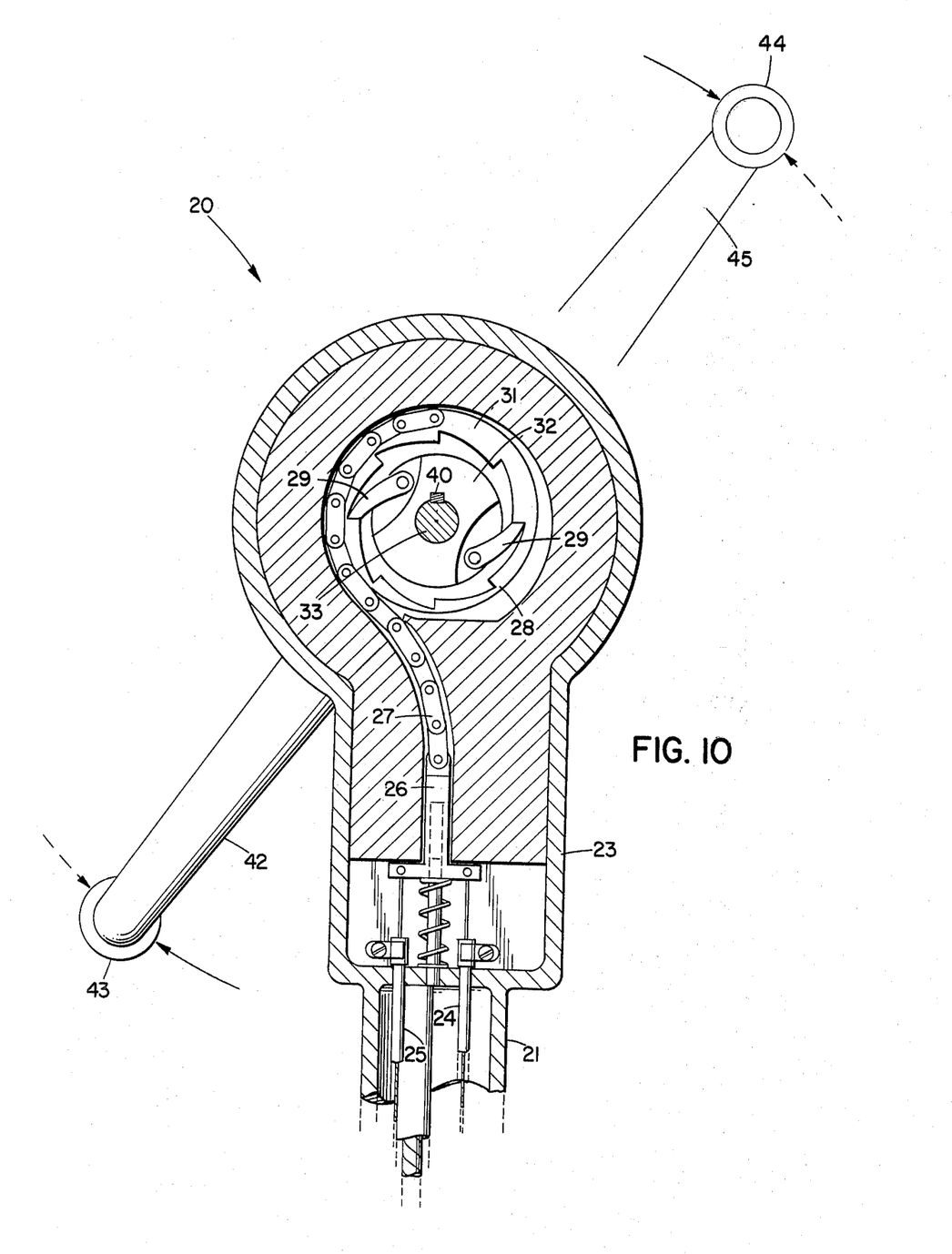
FIG. 10 is a view in cross section taken along the plane indicated by the line 10—10 of FIG. 8.
Figure 11:
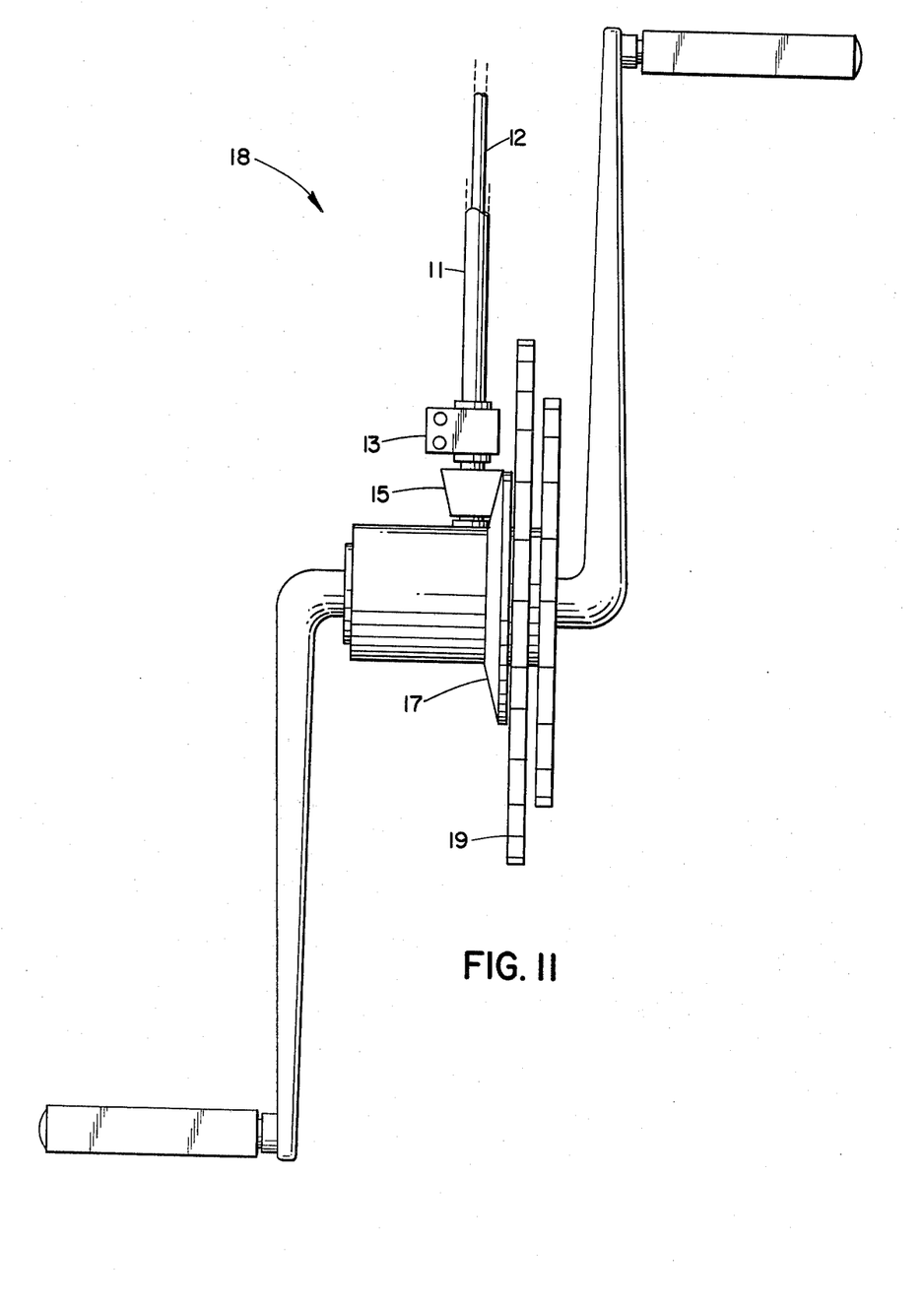
FIG. 11 is a fragmentary front elevation view of te foot pedal crank assembly showing how the flexible shaft is connected to the sprocket.
Figure 12:
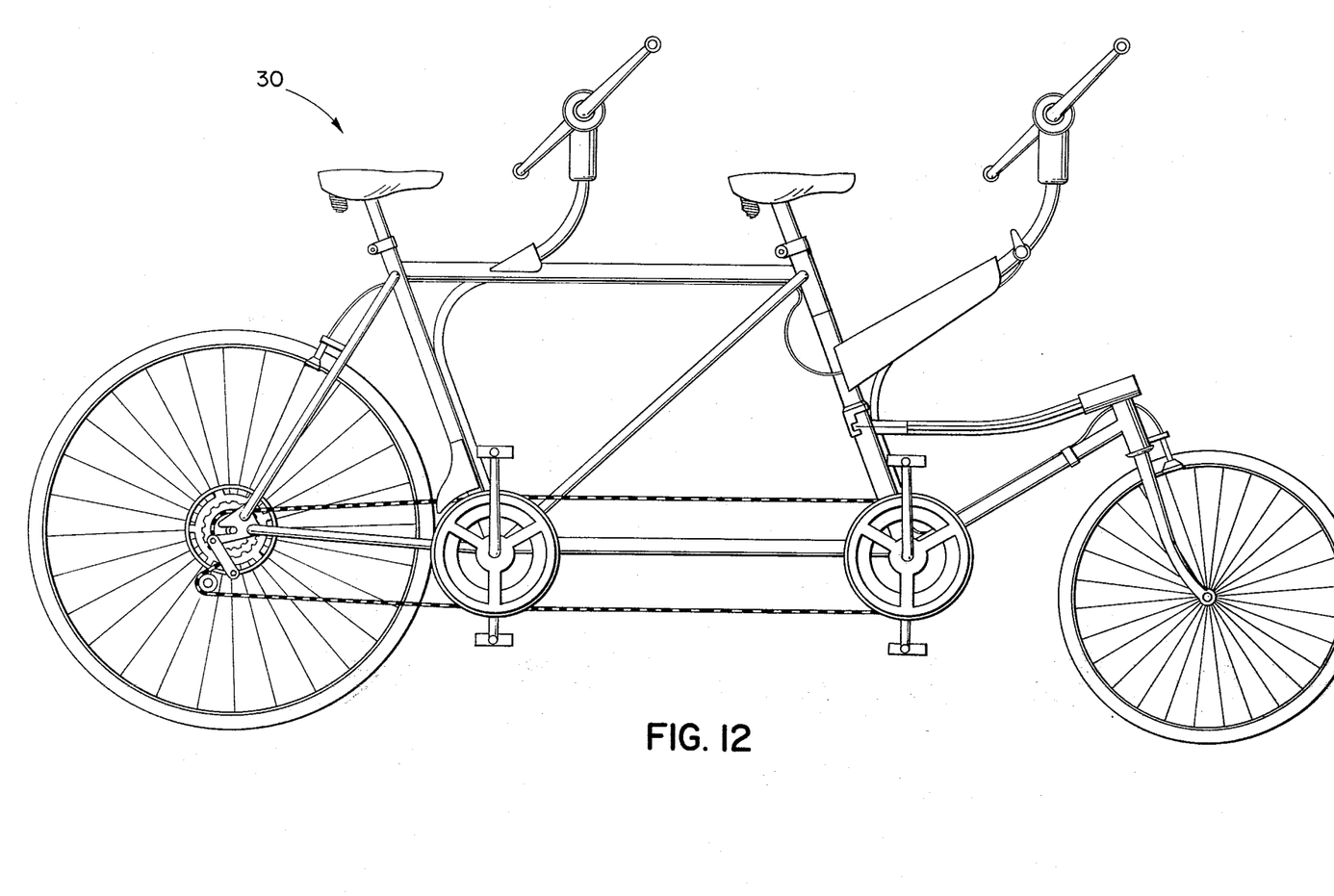
FIG. 12 is a variation in the application of the invention to a tandem or multi-person bicycle as shown in side elevation view embodying this invention.

As seen further in the fragmented sectional view of FIG. 7, inside the gear housing 23, coaxial and pivoting with the manual crank assembly, the ring gear 38 drives the pinion 37. Pinion 37 is connected to the flexible shaft 12 inside the housing 11. The lower end portion of the said flexible shaft 12 is connected to another pinion 15 driving the ring gear 17 coaxial and turning with the foot pedal crank sprocket 19. As in FIG. 9, the manual crank assembly is provided with spring actuated directional pawl mechanisms 39 so that the operator can stop at will or commence his manual cranking without being influenced by the foot pedal cranking process. Also seen in FIG. 9 is a flexible shaft anchor 35 fastened to the housing by the screws 36. In FIG. 11 it is seen that the lower end of the flexible shaft is anchored to the frame 14 by the anchor 13. FIG. 10 shows a follower mechanism coaxial with the manual crank shaft so that should the operator stop his manual forward drive and crank the manual crank in the reverse direction, the limited angular displacement is translated to a linear motion by a flexible means 27 provided with a trust bracket 26 whose front brake cable 25 and rear brake cable 24 are commonly connected. This linear motion by the flexible means 27 will therefore operate simultaneously the front and rear brake. Such functions are made possible by the pawl means 29 of similar construction to the other pawl mechanism 39 only in the counter opposite position. These pawl mechanisms carried by identical carriers 32 and 41 are locked to the manual crank shaft by key 40. Their counter opposte position allows a forward manual cranking rotation to help in the propulsion of the vehicle through the flexible shaft means and likewise also allow a limited manual counter action to operate a dual brake system. FIG. 12 discloses another application of this invention as applied to a tandem or multi-person bicycle.

While in the foregoing I have disclosed an embodiment of the invention in considerable detail for purposes of illustration, it will be understood by those skilled in the art that many of these details may be varied without departing from the spirit and scope of the invention.

I claim:

1. A bicycle comprising a main frame, a rear wheel assembly rotatably mounted on said main frame in supporting relation thereto, a foot operated crank assembly drivingly interconnected to said rear wheel assembly; said main frame including a front fork member pivotally mounted thereto and a front wheel assembly rotatably attached to said front fork in supporting relation to said main frame, said main frame further including a steering arm assembly movably mounted on said frame and including a pivot axis coincident to the central axis of a seat post of said main frame; means interconnecting said steering arm assembly and said front fork member, a manual crank assembly secured to said steering arm assembly so as to move therewith and rotatable about a central crank axis thereof, said crank assembly spaced outwardly from said pivot axis, said manual crank assembly structured and disposed for driving rotational operation by the hands of an occupant and further being drivingly interconnected to at least one of said front wheel and rear wheel assemblies, said manual crank assembly structured and disposed to maintain a substantially parallel relation between said crank axis and an imaginary line connecting the occupant's shoulders during operative rotation of said manual crank assembly, whereby propulsion of said bicycle may be accomplished by hand operation of said manual crank assembly by occupant.

2. A bicycle as in claim 1 wherein said steering arm assembly comprises a steering column pivotally attached to said frame and disposed to have its central longitudinal axis colinear with said pivot axis, and pivotal coincident to said central axis of said seat post, said steering arm assembly further comprising a steering arm extending outwardly from said steering column and movable therewith.

3. A bicycle as in claim 2 wherein said manual crank assembly is secured to said steering arm adjacent a leading end thereof so as to move with said steering column and steering arm relative to a remainder of said main frame, said manual crank assembly disposed to have its crank axis disposed and maintained relatively perpendicular to a plane defined by the respective central axis of both said steering column and said steering arm during operation of said manual crank assembly.

4. A bicycle as in claim 1 wherein said manual crank assembly comprises a directional drive clutch mechanism interconnected in regulating relation to rotational driving thereof, whereby stopping and commencement of said manual crank assembly is unaffected by driving rotation of said foot operated crank assembly.

5. A bicycle as in claim 1 wherein said manual crank assembly further comprises a follower mechanism disposed in substantially coaxial relation to said crank axis and movably attached to a sprocket thereof, said follower mechanism being interconnected by cable means to brake means of said bicycle in actuating relation thereto and further being structured to convert limited rotational movement of said latter sprocket to linear movement of said cable means when the forward direction of rotation of said manual crank assembly is reversed, whereby braking of said bicycle occurs.

6. An occupant propelled vehicle comprising a main frame, a rear wheel assembly and front wheel assembly each rotatably mounted on said main frame in supporting relation thereto; said main frame including a steering assembly comprising a steering column movably mounted on said main frame in coaxial relation to a central axis of a seat post of said main frame, means interconnecting said front wheel assembly and said steering assembly, a steering arm connected to and extending outwardly from said steering column and movable therewith, a manual crank assembly connected to a leading portion of said steering arm and movable therewith, said steering column, steering arm and manual crank assembly collectively pivotal relative to a remaining portion of said main frame coincident to said central seat post axis, said manual crank assembly positioned for operational rotation by the hands of the occupant and comprising a central crank axis of rotation disposed and maintained in substantially perpendicular relation to a plane defined by the central axis of said steering column and steering arm, said manual crank assembly interconnected in driving relation to at least one of said front and rear wheel assemblies and in activating relation to brake means of said vehicle, whereby propulsion and braking of said bicycle may be selectively accomplished through the operation of said manual crank assembly.

* * * * *